United States Patent [19]

Ansley

[11] Patent Number: 5,574,580
[45] Date of Patent: Nov. 12, 1996

[54] LCD WITH INTEGRAL LIGHT CONFINEMENT HAVING A PAIR OF AFOCAL LENSLETS POSITIONED BETWEEN LIQUID CRYSTAL CELLS AND COLOR POLARIZERS

[75] Inventor: David A. Ansley, Sterling, Va.

[73] Assignee: Hughes Aircraft Company, Los Angeles, Calif.

[21] Appl. No.: 570,807

[22] Filed: Dec. 12, 1995

Related U.S. Application Data

[63] Continuation of Ser. No. 130,608, Oct. 1, 1993, abandoned.

[51] Int. Cl.$^6$ .................. G02F 1/1335; G02F 1/1347
[52] U.S. Cl. .................. 359/41; 359/40; 359/53; 359/64
[58] Field of Search .................. 359/40, 53, 64, 359/41, 42

[56] References Cited

U.S. PATENT DOCUMENTS

| | | | |
|---|---|---|---|
| 4,416,514 | 11/1983 | Plummer | 350/335 |
| 4,917,465 | 4/1990 | Conner et al. | 359/41 |
| 4,966,441 | 10/1990 | Conner | 359/53 |
| 5,050,965 | 9/1991 | Conner et al. | 359/53 |
| 5,052,783 | 10/1991 | Hamada | 359/40 |
| 5,083,854 | 1/1992 | Zampolin | 359/40 |
| 5,101,279 | 3/1992 | Kurematsu et al. | 359/40 |
| 5,124,818 | 6/1992 | Conner et al. | 359/53 |
| 5,148,319 | 9/1992 | Gratrix et al. | 359/642 |
| 5,153,621 | 10/1992 | Vogeley | 353/30 |
| 5,187,599 | 12/1993 | Nakanishi et al. | 359/41 |
| 5,383,056 | 1/1995 | Nishii et al. | 359/561 |

FOREIGN PATENT DOCUMENTS

0490171A2  6/1992  European Pat. Off. .................. 359/40

OTHER PUBLICATIONS

U.S. Patent application Ser. No. 08/046,060, filed Apr. 12, 1992 by Gratrix "Method Of Manufacturing Micro-Optical Elements."

Gary A. Dir, Twisted Nematic Display With Improved Multiplexability Utilizing Simple Alignment Technique, Sep./Oct. 1980, pp. 561–562, vol. 5, number 5.

Hetch et al, Optics, Addison–Wesley Series In Physics, Feb. 1979, pp. 152–153.

*Primary Examiner*—Anita Pellman Gross
*Assistant Examiner*—Toan Ton
*Attorney, Agent, or Firm*—Michael W. Sales; Wanda K. Denson-Low

[57] ABSTRACT

Telecentric afocal microlens combinations are inserted between the liquid crystal cells of an active matrix liquid crystal subtractive color display to retain light within a projection of each liquid crystal pixel as the light propagates through the system. A resulting reduction in light losses at the edge of each pixel significantly improves the output brightness and resolution.

10 Claims, 4 Drawing Sheets

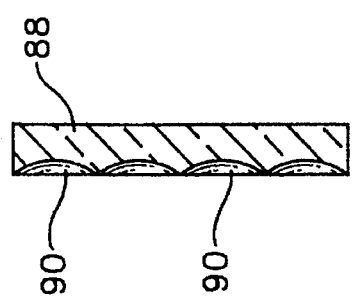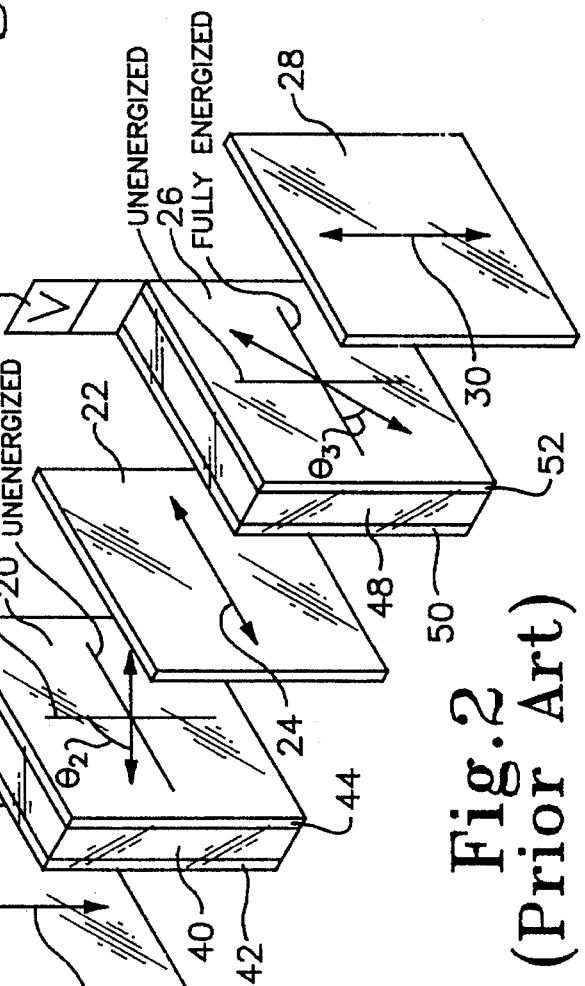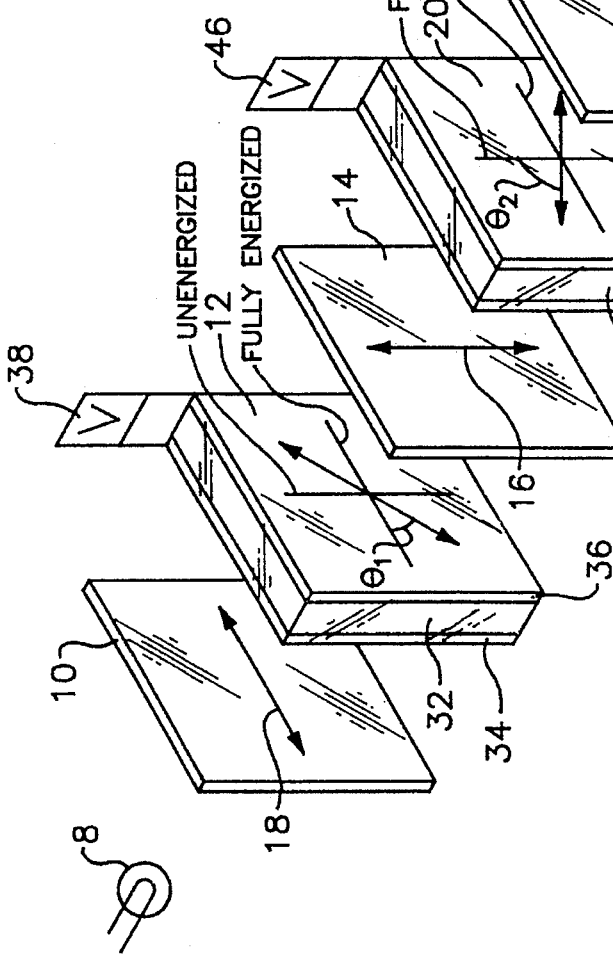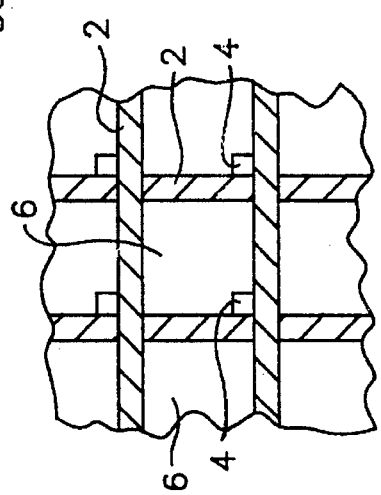

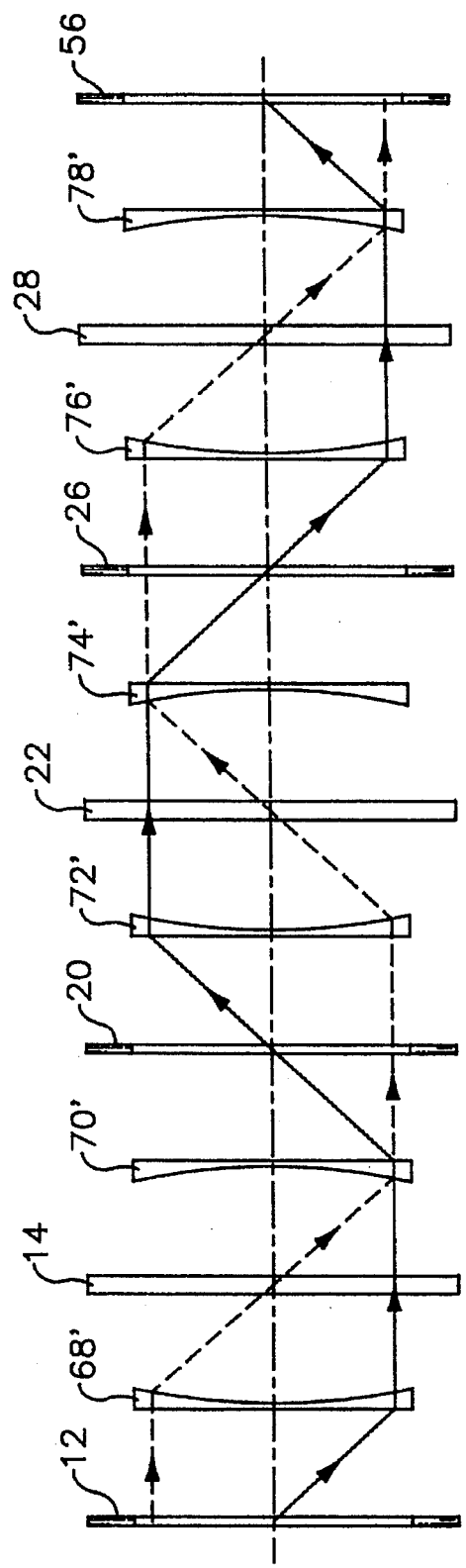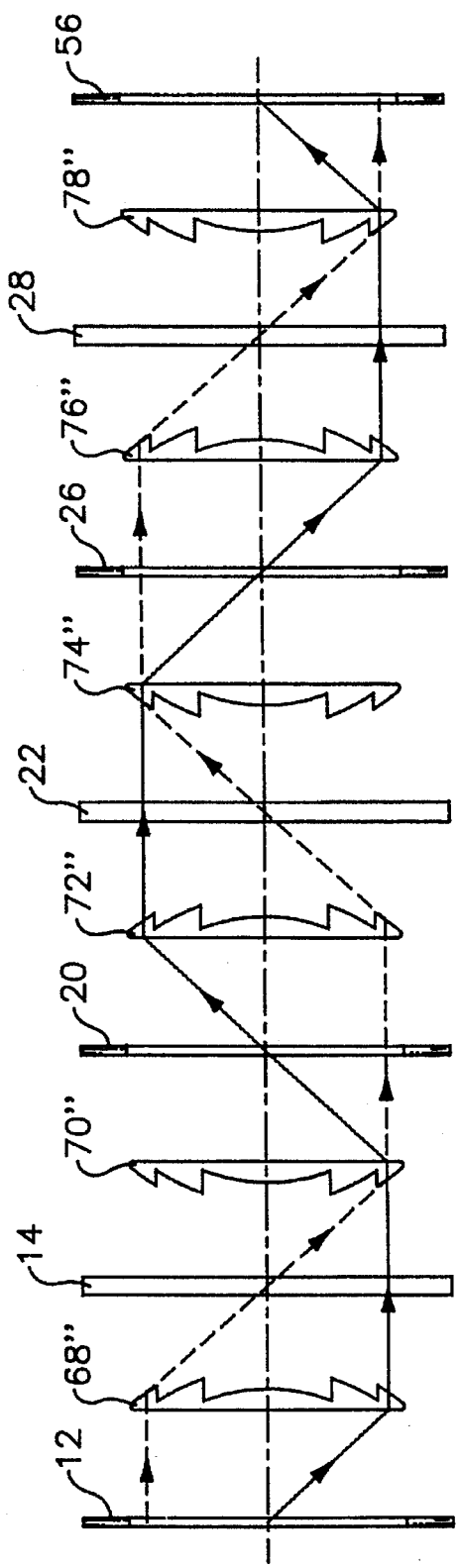

5,574,580

LCD WITH INTEGRAL LIGHT CONFINEMENT HAVING A PAIR OF AFOCAL LENSLETS POSITIONED BETWEEN LIQUID CRYSTAL CELLS AND COLOR POLARIZERS

This is a continuation U.S. application Ser. No. 08/130,608 filed Oct. 1, 1993, now abandoned.

BACKGROUND OF THE INVENTION

1. Field of the Invention

This invention relates to active matrix subtractive color displays, and more particularly to miniature displays which use liquid crystals as polarization rotation elements and retain light propagation through the display mechanism within projections of the liquid crystal pixels.

2. Description of the Related Art

Active matrix liquid crystal cells that are divided into an array of pixels, with the liquid crystal alignment within each pixel subject to independent electronic control, are well known. A portion of such an active matrix array is illustrated in FIG. 1. A grid of electrical lead lines 2 provide activating signals to control transistors 4 within each pixel 6 of the cell. Transparent plate electrodes (not shown) are provided over the front and rear surfaces of each pixel, and an electric field is established between the electrodes for each pixel in accordance with the signal applied to the pixel transistor 4. The liquid crystals within each pixel assume an angular orientation that varies with the field strength. The liquid crystal orientation in turn establishes a polarization direction for light transmitted through the pixels. The polarization angle of polarized light transmitted through each pixel can thus be controlled by applying a desired pattern of electrical signals to the various pixel transistors.

Active matrixes have been used in the past in subtractive color displays, such as that disclosed in U.S. Pat. No. 4,416,514, issued Nov. 22, 1983. The basic construction of this device is illustrated in the exploded view of FIG. 2 for a single pixel; an array of many such pixels would normally be employed. A light source 8 illuminates a color-neutral linear polarizer plate 10. Next in line is a liquid crystal cell 12 that rotates the polarization angle of the various pixels up to 90°. This is followed in succession by a cyan color linear polarizer 14 with a polarization axis 16 at right angles to the polarization axis 18 of neutral linear polarizer 10, another liquid crystal cell 20 that has an unenergized polarization axis perpendicular to that of cell 12, a magenta color linear polarizer 22 whose polarization axis 24 is perpendicular to that of the cyan polarizer 16, a third liquid crystal cell 26 whose unenergized polarization axis is perpendicular to that of cell 20 and parallel to that of cell 12, and finally a yellow color linear polarizer 28 whose polarization axis 30 is perpendicular to that of polarizers 10 and 22, and parallel to that of polarizer 14.

The liquid crystal cell 12 consists of a liquid crystal layer 32 sandwiched between transparent electrodes 34, 36, with an electrical input at 38 to control the voltage across the electrode plates. Similarly, the liquid crystal cell 20 consists of a liquid crystal layer 40 bounded by transparent electrode plates 42, 44 with an electrical input 46, and cell 26 consists of a liquid crystal layer 48 bounded by transparent electrode plates 50, 52 with an electrical input 54.

In practice, each of the liquid crystal "cells" 12, 20, 26 is a single pixel within a much larger pixel array, with each of the pixels independently controlled. The assembly functions as a subtractive color display by applying electrical signals to each of the cells that cause their liquid crystals to assume desired angular orientations, such as θ1, θ2 and θ3 as illustrated. The light from source 8 which emerges from neutral polarizer 10 is horizontally polarized. Color polarizers 14, 22 and 28 respectively filter out red, green and blue. The amount of filtering varies with the difference between the polarization angle of each polarizer and the polarization angle of the light incident on that polarizer; full filtering is achieved with a 90° difference, while no filtering results from parallel polarization angles. Depending upon the polarization rotation imparted by each of the liquid crystal cells, the viewer sees a gamut of color hue, saturation and brightness.

When used in miniaturized applications, such as helmet mounted displays, there is a significant problem of light loss as the light is processed through the display. For example, a 1,024×1,280 pixel display with three color subtractions will have a total of 3×1024×1280=3,932,160 individually energized liquid crystal pixels. For miniaturized displays, the center-to-center spacing between liquid crystal pixels may be about 25 micrometers (microns) and the total pixel areas may be about 25×25 microns, of which the transparent area occupies about 18×18 microns. Collimated light from a point source, after passing through the transparent area of each pixel, is diffracted into increasingly greater diverging angles as the size of the pixel is reduced. For an 18×18 micron pixel, the light intensity at a distance of 2 mm from the pixel drops to approximately 7% of the intensity at about 0.2 mm. This loss of light is aggravated if the input beam is divergent rather than collimated.

The light spreading has a very detrimental effect for subtractive color displays. Whereas the light that passes through each pixel of the first liquid crystal layer will ideally pass through the corresponding pixels in the subsequent layers, the effect of light spreading is that a portion of the light from a given pixel in the first layer will be transmitted to non-corresponding pixels in subsequent layers, or lost from the display completely if the pixel is in the vicinity of the periphery. This results in a degradation of both resolution and brightness.

SUMMARY OF THE INVENTION

The present invention seeks to provide an active matrix liquid crystal subtractive color display that is subject to miniaturization with a much lower loss in both brightness and resolution.

This goal is accomplished with a system in which a compact light confinement mechanism is provided between each of the polarization rotating liquid crystal cells, and also between the last liquid crystal cell and an image surface. The light confiners are implemented on a pixelized basis by pairs of telecentric afocal lenslet arrays, with the lenslets of each array substantially aligned with, and substantially equal in size and focal length to, corresponding lenslets in the other arrays. Successive lenslet arrays are spaced from each other by approximately two focal lengths, and are oriented counter to each other to inhibit light spreading between the liquid crystal cells, and between the last cell and the image surface.

With the use of the telecentric afocal microlenses and the subtractive color display, improvements of greater than an order of magnitude have been noted in the amount of light that is successfully transmitted to the correct location on the image surface. Further features and advantages of the invention will be apparent to those skilled in the art from the following detailed description, taken together with the accompanying drawings.

BRIEF DESCRIPTION OF THE DRAWINGS

FIG. 1 is fragmentary idealized view showing a pixelized portion of an active matrix liquid crystal display;

FIG. 2 is an exploded perspective view illustrating in diagrammatic form a prior active matrix liquid crystal subtractive color display, described above;

FIGS. 5 and 6 are optical diagrams illustrating alternate lens configurations to the embodiment of FIG. 4;

FIG. 7 is a section view of a microlens array that can be used for the invention;

DETAILED DESCRIPTION OF THE INVENTION

The invention uses a series of microlens arrays to re-image each pixel from one liquid crystal layer to the next, and from the last liquid crystal layer to an image surface. Thus, for a 1,024×1,280 pixel array, 1,310,720 microlenses are required between each layer. The microlenses are configured so as to restrict the transmission of light between successive cells within projections of the pixels.

Figure 3:
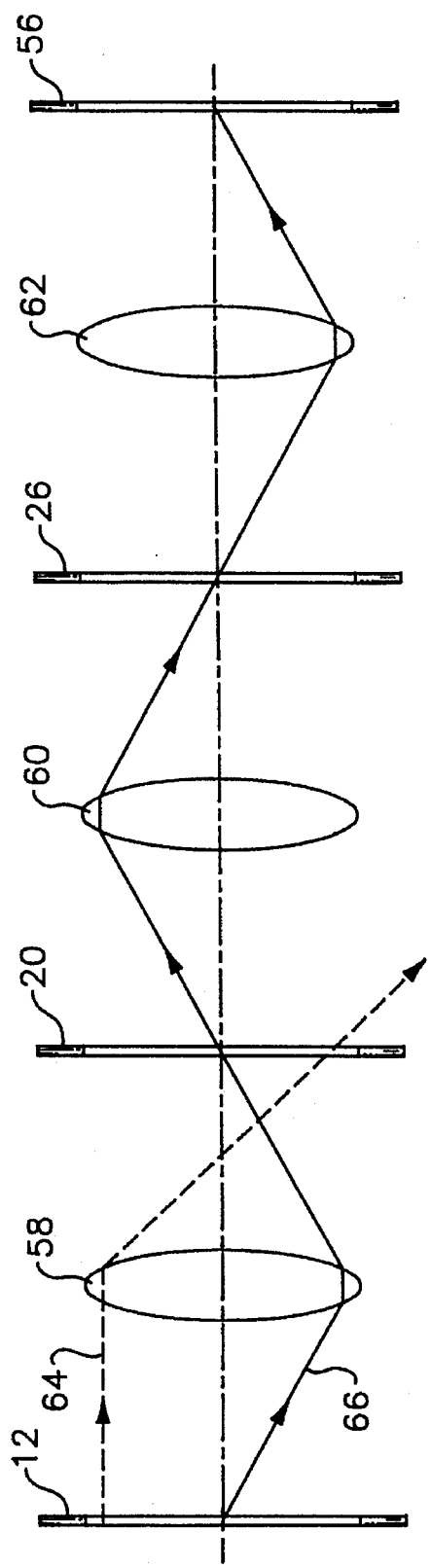
FIG. 3 is an optical diagram illustrating a partial approach to solving the light loss problem.

Simple microlens arrays, however, are unsuitable for this purpose. This is illustrated in FIG. 3, in which three liquid crystal cells 12, 20 and 26 are illustrated, along with a display screen 56 that presents an image surface to the nearest liquid crystal cell 26. The same reference numbers are used for the active matrix liquid crystal cells as in FIG. 2, indicating that the same cell structures can be employed. In this figure the color polarizers are not shown for purposes of simplification, but in reality they would be present.

Focusing lenses 58, 60 and 62 are positioned midway between successive pairs of cells, and between the last cell 26 and the projection screen 56. The lenses are implemented as microlenses that are replicated on a pixelized basis across the cell area; only one pixel is illustrated in FIG. 3. Microlens 58 successfully images the liquid crystal cell 12 onto the next liquid crystal cell 20 (the chief rays 64 and marginal rays 66 are indicated by dashed and solid lines, respectively). However, the chief ray 64 exits the system before it reaches the second microlens 60. This represents a light loss that grows worse as the remaining light propagates towards the projection screen.

Figure 4:
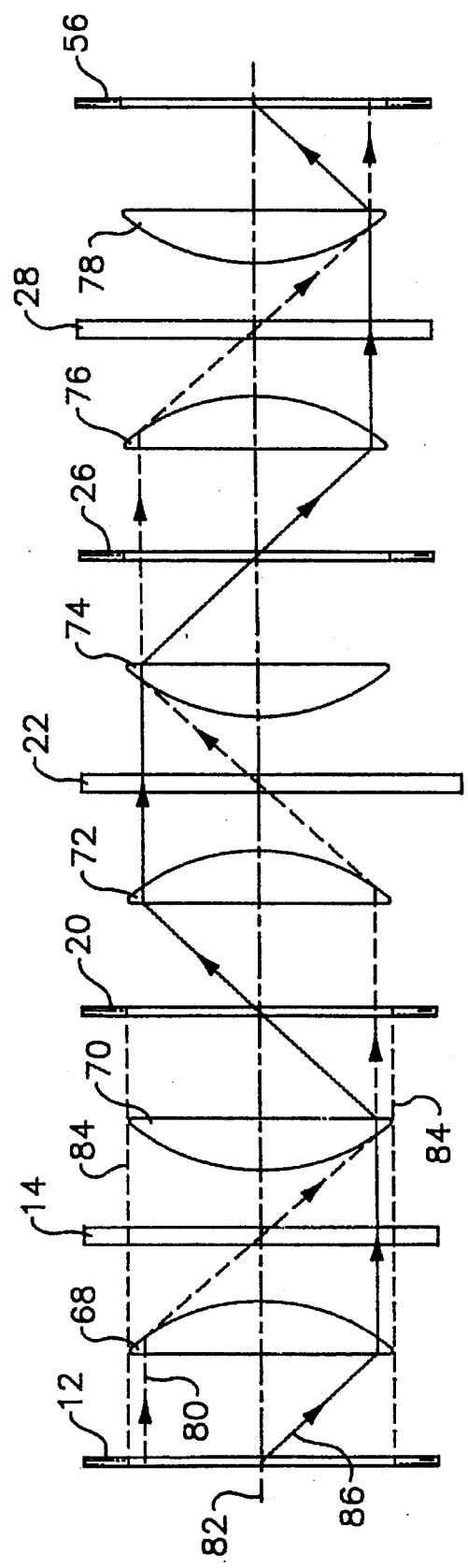
FIG. 4 is an optical diagram illustrating the approach taken by the invention to solving the loss of light problem in a subtractive color display.

The solution proposed by the invention is illustrated in FIG. 4, in which the liquid crystal cells 12, 20 and 26 are again identified by the same reference numerals, as is projection screen 56. A pair of microlens lenslets 68 and 70 are positioned between the liquid crystal cells 12 and 24, while similar lenslet pairs 72, 74 and 76, 78 are positioned respectively between liquid crystal cells 20 and 26, and between cell 26 and screen 56. In this figure the color polarizers 14, 22 and 28 are also shown.

Each pair of lenslets is fabricated and arranged in a similar manner, so that the following description of lenslets 68 and 70 also applies to the other lenslet pairs. Each pair of lenslets is preferably equal in size to the other pairs, and is aligned along a common optical axis that extends through the center of the liquid crystal pixels.

The first lenslet 68 is spaced one focal length f from the first liquid crystal cell 12, while the second lenslet 70 is spaced an equal distance f from the second liquid crystal cell 20. The two lenslets are spaced apart by a distance 2f, and are oriented counter to each other. The first lenslet 68 focuses collimated light (chief ray 80) from the first liquid crystal cell 12 onto the first color polarizer 14, where it crosses over the optical axis 82 and continues onto a corresponding location on the opposite side of the second lenslet 70. There it is recollimated and projected through the second liquid crystal cell 20 to the second lenslet pair 72, 74. The chief ray 80 is thus restricted to a projection 84 of the liquid crystal pixels for the successive cells, and is not lost to the system.

Marginal rays such as ray 86, which originates at the center of the pixel for liquid crystal cell 12 and is directed towards the outer edge of lens 68, are similarly restricted to the pixel projection. Rays 86 are collimated by the first microlens 68, and then focused by the second microlens 70 onto the second liquid crystal cell 20. They cross over the optical axis at cell 20 and continue on to the first lenslet 72 of the second pair, where they are again collimated.

The arrangement of FIG. 4 assumes that the index of refraction of the lenslets is greater than that of the medium between the lenslets. This is the case, for example, with lenslets formed from flint glass (refractive index=1.7), and BK-7 glass (a standard glass produced by Schott Optical Company, refractive index=1.517) is the medium between lenslets.

FIG. 5 illustrates the solution if the index of refraction for the lenslets is less than that of the medium between lenslets. This would be the case, for example, for lenslets implemented with shaped air gaps, with a refractive index of 1.0. The lenslet 68', 70', 72', 74', 76', 78' are positioned in a manner similar to the corresponding lenslets in FIG. 4, but they are now concave rather than convex. In practice, the optimum index of refraction for the lenslets should be fairly close to that of the intervening medium to reduce Fresnel reflection losses at each medium/lenslet interface.

Another lenslet variation that can make the assembly even smaller is illustrated in FIG. 6. In this embodiment, the lenslets are implemented with kinoform lenslets 68", 70", 72", 74", 76", 78". A kinoform lens is a Fresnel lens whose thickness is reset to a minimum value whenever it reaches one wavelength of the incident light. The kinoform can be made using binary optics to achieve a "stair step" approximation of the lens shape. Although some reduction in lens thickness is possible with this approach, the lenslets of FIG. 4 are already very thin, and the additional practical benefit to be obtained from kinoform lenslets is not great.

Each pair of lenslets between liquid crystal cells is referred to herein as a telecentric afocal microlens pair. The term "telecentric refers" to the fact that the chief rays are parallel to the optical axis in the image space, while the lenslets are "afocal" because the lenslet pairs do not focus an input collimated beam onto the next liquid crystal cell, i.e., the spacing between the two lenslets is 2f.

A section of a microlens array that can be used in the invention is illustrated in FIG. 7. The microlenses are fabricated on a substrate 88, such as BK-7 glass. The lenslet areas 90 are formed in the substrate, and are filled with an optical cement or epoxy having the desired refractive index.

Several methods are available for manufacturing the microlenses. One is referred to as Laser Assisted Controlled Etching (LACE), and is described in U.S. Pat. No. 5,148,319, issued Sep. 15, 1992 to Gratrix et al. In this method a finely focused laser beam is used to write a variable intensity pattern on a linear photoresist. The variable intensity pattern causes the photoresist to harden as a function of the intensity. The exposed photoresist is placed in an acid etch to remove its unhardened portion, the depth of the etch in the photoresist being a function of the laser writing beam intensity. The profiled microlens pattern is then transferred to glass and filled with a glass or optical epoxy of the desired refractive index.

Another technique for fabricating the microlenses is to defocus the laser beam to the desired diameter of the microlens during the exposure of the linear photoresist. For square microlenses, a square opaque mask in contact with the photoresist is used. The intensity profile of the laser beam is adjusted to the desired intensity profile by apodizing the beam. A common method used to apodize the beam is to spin a slit of varying width in the beam; the advantage of this technique is that no scanning is required. An x-y stepping assembly is used to move to the next microlens location, but remains stationary during the local photoresist exposure.

An alternate microlens fabrication technique involves plasma etching. It is described in U.S. patent application Ser. No. 08/046,060, filed Apr. 12, 1992 by Gratix. Other fabrication methods may also be useful, such as the ion implantation method normally used to manufacture gradient index lenses.

In general, the focusing properties of the microlenses can be controlled by adjusting the lens curvature and/or its index of refraction. A greater refractive index allows for a shallower curvature, and thus a thinner device. In cases where the fabrication process does not allow for fine control of the radius of curvature, the lenslets can be manufactured to an approximate radius of curvature, with final adjustments made by mixing the optical cements used for the lenslets to obtain a precise refractive index that corresponds to the actual radius.

Figures 8, 9:
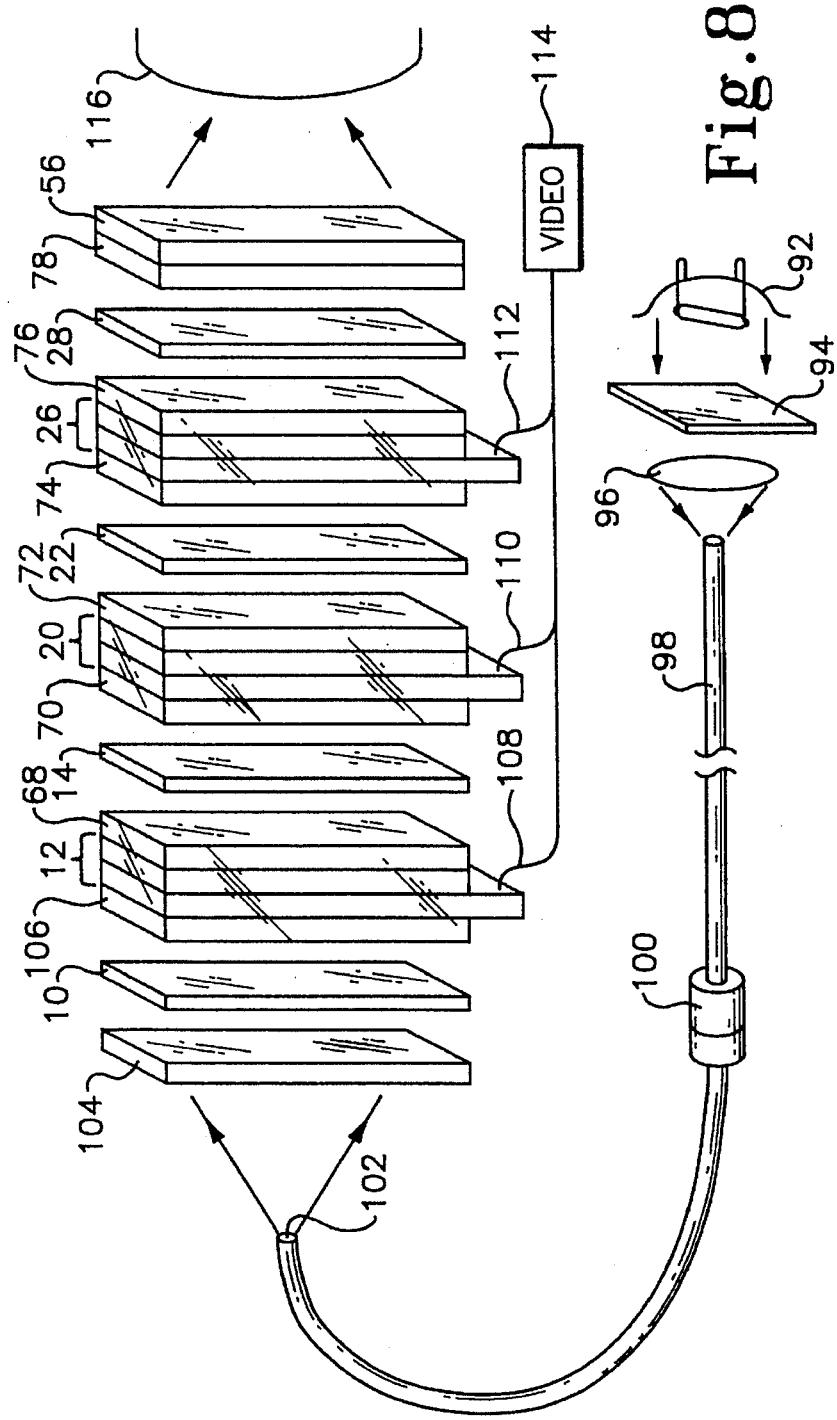
FIG. 8 is an exploded perspective view in block diagram format of an active matrix liquid crystal subtractive color display system that uses the invention.
FIG. 9 is a table of optical intensities at various locations in subtractive color displays with and without the invention.

An overall subtractive color display implemented with the invention is shown in FIG. 8; the same reference numbers are used as in previous figures for common elements. Light from a source such as a xenon lamp 92 is directed through a chroma notch filter 94 to provide any desired bandwidth alteration, and focused by a coupling lens 96 into an optical fiber pipe 98, which includes any necessary optical coupling mechanism 100. The opposite end 102 of the light pipe illuminates a kinoform collimator plate 104, which provides the input for the linear polarizer 10. A telecentric afocal microlens array 106 is provided between the linear polarizer 10 and the first liquid crystal cell 12 to prevent loss of light, in a manner similar to that described above. The individual pixels of the liquid crystal cells 12, 20 and 26 are controlled by video signals that are transmitted over lines 108, 110 and 112 from a suitable video control 114. When the color display is used as a helmet mounted display, the projection screen 56 images onto the helmet's visor optics relay lens 116.

Significant improvements have been noted with the invention in retaining optical power during transmission through the system. The system that was studied employed square microlenses with sides about 25 microns long, focal lengths of about 622 microns radii of curvature of about 75 microns, and a SAG of about 1.074. The liquid crystal pixels transparent area had sides about 18 microns long. The lenslets were larger than the liquid crystal pixels transparent area because they extended into the electrical supply area between adjacent pixels; as used herein, confining or restricting the light to the pixel projections also includes confining the light to the projected peripheries of the lenslets when the lenslets are somewhat larger than the liquid crystal pixels transparent area themselves. The relative optical powers at each liquid crystal cell and at the projection screen were obtained, with and without the telecentric afocal microlenses of the invention, at a wavelength of 530 nm and with light sources that included a point source and 20, 40 and 60 milliradian sources. The results are summarized in FIG. 9, with the optical power at the first liquid crystal station 12 providing a normalizing reference. The optical powers obtained with the invention are listed in the columns headed INV, while the results without the invention are listed under the columns headed by W/O. In each case, optical power improvements well over an order of magnitude were achieved at the projection screen.

While particular embodiments of the invention have been shown and described, numerous variations and alternate embodiments will occur to those skilled in the art. For example, polarization rotation elements other than liquid crystal cells may be developed that could be used with the invention. Accordingly, it is intended that the invention be limited only in terms of the appended claims.

I claim:

1. An active matrix liquid crystal subtractive color display, comprising:

a light source, a linear polarizer positioned to linearly polarize light from said light source, at least three color polarizers positioned successively in a path of polarized light from said linear polarizer, at least three active matrix liquid crystal cells positioned respectively between said linear polarizer and the first of said color polarizers in said light path, and between each pair of successive color polarizers, said liquid crystal cells being organized into aligned arrays of independently programmable pixels for rotating the polarization of incident light by programmed amounts, said pixels occupying predetermined areas, and respective optical confiners positioned between each pair of successive liquid crystal cells, said linear and color polarizers and said liquid crystal cells being aligned along an optical axis, each of said optical confiners comprising a respective pair of afocal lenslets, the lenslets of each pair having substantially equal focal lengths and being positioned substantially one focal length from the nearest color polarizer and the nearest liquid crystal cell, said lenslets collectively substantially confining the transmission of light between said cells to pixel projections which do not exceed the areas of said cell pixels so that a collimated beam incident on said linear polarizer along said optical axis emerges as a telecentric collimated beam from the last of said liquid crystal cells in said light patch.

2. The subtractive color display of claim 1, further comprising an image surface on the opposite side of said liquid crystal cells from said light source, and an additional optical confiner positioned between said image surface and its nearest liquid crystal cell, said additional optical confiner substantially confining the transmission of light between said nearest liquid crystal cell and said image surface to said projections of said cell pixels.

3. The subtractive color display of claim 1, each lenslet pair encompassing a respective pixel projection.

4. A subtractive color display, comprising:

a light source, a linear polarizer positioned to linearly polarize light from said light source, at least three color polarizers positioned successively in the path of polarized light from said linear polarizer, at least three pixelizod polarization rotation arrays positioned respectively between said linear polarizer and the first of said color polarizers in said light path, and between each pair of successive color polarizers, said polarization rotation arrays including mutually aligned arrays of independently programmable polarization rotation pixels for rotating the polarization of incident light from said light source by programmed amounts, and a respective pair of telecentric afocal lenslet arrays positioned between each pair of successive polarization rotation arrays, the lenslets of each array being substantially aligned with and substantially equal in size and focal length to corresponding lenslets in the other arrays along respective optical axes that also extend through said linear polarizer, said color polarizers and respective polarization rotation pixels in each of said polarization rotation arrays, with successive lenslet arrays spaced from each other by approximately two focal lengths, and the lenslet arrays of each pair oriented to inhibit light from said light source from spreading between said polarization rotation arrays substantially beyond the limits of said polarization rotation pixels so that a collimated beam incident on said linear polarizer along one of said optical axes emerges as a telecentric collimated beam from the last of said polarization rotation arrays in said light path.

5. The subtractive color display of claim 4, said pixelized polarization rotation arrays comprising respective active matrix liquid crystal cells.

6. The subtractive color display of claim 4, further comprising an image surface on the opposite side of said polarization rotation arrays from said light source, and an additional pair of afocal lenslet arrays positioned between said image surface and its nearest polarization rotation array, said additional pair of afocal lenslet arrays preventing light from said light source from spreading between said image surface and said nearest polarization rotation array substantially beyond the limits of said polarization rotation pixels.

7. A subtractive color display, comprising:

a linear polarizer positioned to receive and linearly polarize light from a source location, at least three color polarizers positioned successively in the path of polarized light from said linear polarizer, at least three pixelized polarization rotation arrays positioned respectively between said linear polarizer and the first of said color polarizers in said light path, and between each pair of successive color polarizers, said polarization rotation arrays including mutually aligned arrays of independently programmable polarization rotation pixels for rotating the polarization of incident light from said linear polarizer by programmed amounts, said pixels occupying predetermined areas, and respective optical confiners positioned between each pair of successive polarization rotation arrays, said linear and color polarizers and the aligned polarization rotation pixels of said polarization rotation arrays being aligned along respective optical axes, each of said optical confiners comprising a respective array of afocal lenslet pairs, the lenslets of said lenslet pairs having substantially equal focal lengths and being positioned substantially two focal lengths form each other, said lenslets substantially confining the transmission of light between said polarization rotation arrays to pixel protections which do not exceed the area of said pixels so that a collimated beam incident on said linear polarizer along one of said optical axes emerges as a telecentric collimated beam from the last of said polarization rotation arrays in said light path.

8. The subtractive color display of claim 7, said pixelized polarization rotation arrays comprising respective active matrix liquid crystal cells.

9. The subtractive color display of claim 7, further comprising an image surface on the opposite side of said polarization rotation arrays from said linear polarizer, and an additional optical confiner positioned between said image surface and its nearest polarization rotation array, said additional optical confiner substantially confining the transmission of light between said nearest polarization rotation array and said image surface to projections of said polarization rotation pixels.

10. The subtractive color display of claim 7, each lenslet pair encompassing a respective pixel projection.

* * * * *